No. 633,934. Patented Sept. 26, 1899.
H. D. WILSON.
COTTON PLANTER AND FERTILIZER DISTRIBUTER.
(Application filed Aug. 15, 1899.)

(No Model.)

Witnesses
Albert B. Blackwood
H. P. Doolittle

Inventor
Henry D. Wilson
by M. H. Doolittle & Son
Attorneys

UNITED STATES PATENT OFFICE.

HENRY D. WILSON, OF BAINBRIDGE, GEORGIA.

COTTON-PLANTER AND FERTILIZER-DISTRIBUTER.

SPECIFICATION forming part of Letters Patent No. 633,934, dated September 26, 1899.

Application filed August 15, 1899. Serial No. 727,308. (No model.)

*To all whom it may concern:*

Be it known that I, HENRY D. WILSON, a citizen of the United States, residing at Bainbridge, in the county of Decatur and State of Georgia, have invented certain new and useful Improvements in Cotton-Planters and Fertilizer-Distributers; and I do hereby declare the following to be a full, clear, and exact description of the invention, such as will enable others skilled in the art to which it appertains to make and use the same.

My invention relates to cotton-planters and fertilizer-distributers.

The objects of my invention are to provide a machine for planting cotton and distributing fertilizer that can be readily attached to and detached from an ordinary plow-stock; to provide means for securing the planter and distributer to the plow-stock in such manner that it will be below the center of gravity of the stock and can be easily controlled from the handles and given a steady and even travel; to provide means for clearing the path of the seed-hopper and cutting away the soil parallel to the path, so as to enable the covering-blades to form a sharp clearly-defined elevated ridge covering the cotton-seed, and to provide means of a simple and convenient character to regulate the feed from the hopper.

To these ends my invention consists of the parts and combinations of parts hereinafter set forth and claimed.

The device is illustrated in the accompanying drawings, in which—

Figure 1:
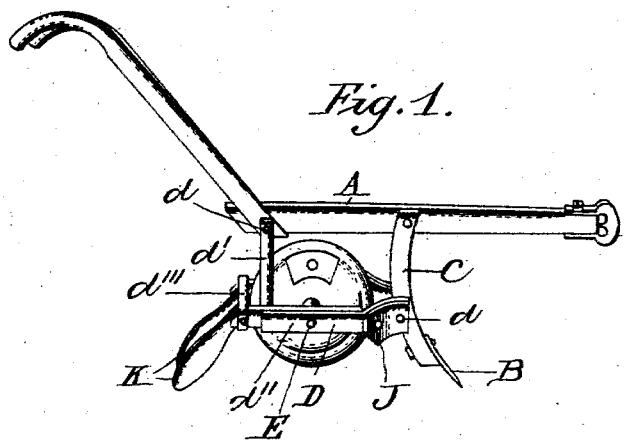
Figure 4:
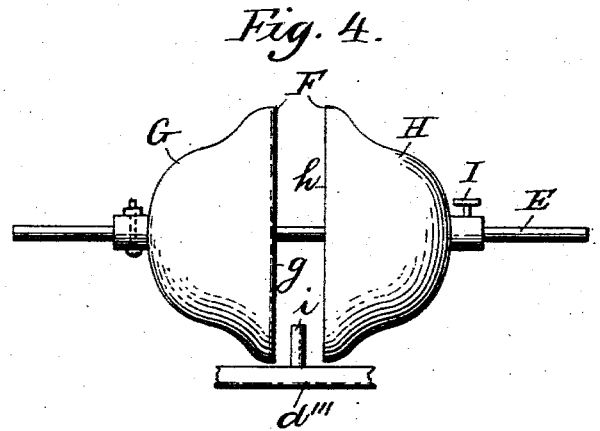
Figure 2:
Figure 3:
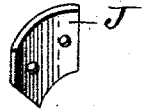

Figure 1 is a side view in elevation of my improved planter and distributer; Fig. 2, a detailed plan of combined fender and ridge-clearer; Fig. 3, a detail front elevation of same feature, and Fig. 4 an elevation of the two semicylinders forming the hopper.

Throughout the drawings the same letters of reference denote identical parts.

Referring to the drawings, A is a beam of a plow-stock of ordinary construction, provided with a plow B, carried by standard C.

Removably attached by bolts $d$ to the rear end of the plow-beam and to the standard C is the planter and fertilizer frame D, composed of depending vertical arms $d'$, horizontal arms $d''$, and cross-brace $d'''$. An axle E is mounted in the frame and carries the seed and fertilizer hopper F. This hopper is composed of two semicylinders or bowls G and H. One of these parts G is fixed on the axle E, while the other part H is adjustable thereon to and from the part G and is held at the desired distance from the latter part, so as to form a feed-opening, by means of a set-screw I, bearing against the axle. The inner edges $g\ h$ of the semicylinders are curved outward and flattened, so as to form a flat even surface, which will effectually pack the soil over and around the seed dropped from the hopper. A pin $i$ is carried by cross-brace $d'''$ and enters the feed-opening and serves to keep the latter free of the dirt or other obstructions.

The forward ends of the arms $d^{11}$ of the removable frame D are bent or curved inward, and to these ends are bolted or otherwise removably attached plates or wings J, which conform to the curve of the arms and have a sharp edge for cutting the sod or furrow-slice. These wings constitute a fender for clearing the trash and weeds from the path of the hopper, and also a ridge-clearer, by which the ground is cleared away from the path of the feed, so that the covering-blades will form a cleanly-cut sharp planting-ridge having clear unobstructed sides.

To the rear ends of arms $d''$ are secured covering-blades K, which follow and cover the seed dropped from the hopper and form the ridge above referred to. The plowshare, the bottom of the hopper, and the ends of the covering-blades are on a level and a regular and close feed of the seed is thus secured and scattering of the same prevented.

In operation the cotton-seed or the fertilizer is placed in the hopper, and the feed-opening of the hopper is first adjusted to the required size. This is done in a very simple and convenient manner by merely sliding the movable part H to the desired position and adjusting the set-screw on the axle. In such construction all interior mechanism for adjusting the parts of the hopper to and from each other is dispensed with and the only setting means employed are exterior of the hopper and capable of easy manipulation, while, owing to the fact that only one of the semicylinders is movable, the hopper is less liable to get out of order than in those planters where both parts are adjustable or where bands or other mechanisms of a more or less complicated nature are employed. By locating the hopper-frame beneath the beam and directly to the rear of the plow a complete control of the hopper by the handles is assured and the hopper is held firmly down into the planting-furrow and a steady even travel obtained, thereby feeding the seed directly into the bottom of the furrow in a continuous unbroken stream and insuring a perfect stand of cotton. In most planters the hopper is mounted directly in the plow-frame, and its center of gravity is thereby usually raised so high that the hopper will be unsteady and will be given a rocking and wabbly motion by even slight obstructions in its path, thus causing the planter to travel in crooked line and to feed the seed in a scattered and uneven manner, so as to thereby produce an irregular or imperfect stand of cotton. By my arrangement of the auxiliary hopper-frame secured to the plow-stock directly under the rear part of the beam and just behind the plow the above objections are obviated and not only is a firmly-bearing and steadily-traveling hopper secured, but also one that can be readily detached from and attached to any plow. Following the plow the fender and ridge-clearing wings J by means of their curved surfaces turn away the weeds and trash from the path of the hopper and also cut away the tops of the walls of the furrow made by the plow, so as to leave the ridge formed by the coverers free and unobstructed and elevated above the surrounding surface. The covering-blades K then form a narrow ridge over the cotton-seed, and this ridge projects freely above the adjacent surface, which has been cut away by the clearer and fender, as just described. The advantage of such a ridge is found in the operation of cotton chopping or thinning. With the ordinary planter the cotton is planted in an uneven ridge having other ridges or hillocks on either side, and through these side ridges or hillocks the blades of the chopper must pass in cutting the stalks. The operation of the chopper is thus rendered more difficult and less regular. By my ridge-clearer and fender and covering-blades a single sharp projecting ridge is formed, and it is through this ridge only that the blades of the chopper are forced to pass to cut the cotton.

It is obvious that numerous changes in the details of construction of my device might be made without departing from the scope of the invention.

Having thus described my invention, what I claim is—

1. In a planter or distributer, in combination with a plow-stock, a beam and plow-standard, a detachable frame, said frame at its rear part having vertical arms attached at their upper ends to the beam near the rear end thereof, said frame having other arms at its front part attached to said plow-standard, a hopper carried by said frame substantially between said standard and vertical arms and under said plow-stock beam, substantially as and for the purpose described.

2. In a planter or distributer, in combination with a frame, an axle journaled therein, a hopper carried by said axle, said hopper in contact with the ground and rotated in its travel thereby, said hopper composed of two parts having an opening between them feeding the material directly from the hopper into the soil, the adjacent edges of the hopper parts flattened to form a packing and covering surface for the fed material, one of said parts fixed to the axle and the other adjustable on said axle toward and from the fixed part, and adjusting and locking means for said hopper parts consisting solely of a set-screw exterior to said hopper and engaging said adjustable part and the axle, substantially as described.

3. In a planter or distributer, in combination with a hopper, a plow, a clearing-wing, on each side of the plow and between the plow and hopper, said wings curved outwardly and provided with lower cutting edges above the level of the plowshare to cut the furrow-slices turned by said plow, substantially as described.

4. In a planter or distributer, a hopper, clearing-wings in front of said hopper and covering-blades to the rear of said hopper, substantially as described.

5. In a planter or distributer, in combination with a plow, a hopper, clearing-wings between said plow and hopper, and ridge-forming covering-blades to the rear of said hopper, said wings provided with lower cutting edges, said edges above the level of the ends of said blades, substantially as described.

6. In a planter or distributer, in combination with a plow and plow-stock, a detachable frame, a hopper having a regulable feed-opening, ridge-forming covering-blades to the rear of said hopper, and cutting-wings between said plow and hopper to clear away the soil parallel to the ridge formed by the blades, said hopper, wings and blades carried by said detachable frame, substantially as described.

7. In a planter or distributer, a hopper composed of two semicylindrical parts, the inner portions of the same flared outward and flattened for a considerable distance from the edges whereby opposite flat even surfaces are formed by which the soil is packed over the seed, substantially as described.

In testimony whereof I affix my signature in presence of two witnesses.

HENRY D. WILSON.

Witnesses:
H. P. DOOLITTLE,
GRAFTON L. McGILL.